United States Patent [19]

Rossi et al.

[11] Patent Number: 4,693,908

[45] Date of Patent: Sep. 15, 1987

[54] MAGNETIC RECORDING DISK WITH IMPROVED LUBRICANT RETENTION

[75] Inventors: Eva-Maria Rossi, Menlo Park; Armin R. Tietze, San Jose, both of Calif.

[73] Assignee: International Business Machines Corporation, Armonk, N.Y.

[21] Appl. No.: 766,623

[22] Filed: Aug. 19, 1985

[51] Int. Cl.[4] ............................................. G11B 5/708
[52] U.S. Cl. .............................. 427/130; 252/62.54; 427/128; 427/131; 428/315.5; 428/315.9; 428/317.9; 428/694; 428/695; 428/900
[58] Field of Search ............ 428/694, 695, 900, 423.9, 428/315.5, 315.9, 317.9; 427/128, 130, 131; 252/62.54; 360/134-136

[56] References Cited

U.S. PATENT DOCUMENTS

| | | | |
|---|---|---|---|
| 4,032,682 | 6/1977 | Masson | 427/130 |
| 4,163,823 | 8/1979 | Legras | 427/132 |
| 4,299,882 | 11/1981 | Togawa | 427/130 |
| 4,368,237 | 1/1983 | Yamada | 428/522 |
| 4,405,684 | 9/1983 | Blumentritt | 428/336 |
| 4,450,199 | 5/1984 | Tadokoro | 428/694 |
| 4,546,035 | 10/1985 | Ko et al. | 428/315.9 |
| 4,567,096 | 1/1986 | Piltingsrud | 428/695 |
| 4,590,127 | 5/1986 | Hashimoto | 428/695 |

FOREIGN PATENT DOCUMENTS 3341205   5/1984   Fed. Rep. of Germany .

Primary Examiner—Ellis P. Robinson
Attorney, Agent, or Firm—Thomas R. Berthold

[57] ABSTRACT

The addition of water and an inverse micelle forming surfactant in an appropriate molar ratio to the organic binder used as a coating for magnetic recording disks results in the formation of micropores of uniform size and distribution in the coating when the water evaporates during curring of the coating. The size and number of the micropores is controlled by the water/surfactant molar ratio, the amount of water and the amount of surfactant. This permits the design and control of the amount of liquid lubricant retained in the disk coating.

2 Claims, 2 Drawing Figures

MAGNETIC RECORDING DISK WITH IMPROVED LUBRICANT RETENTION

TECHNICAL FIELD

This invention relates to a magnetic recording disk of the type having a coating of magnetic particles dispersed within an organic binder, and more particularly to such a disk having improved lubricant retention.

BACKGROUND OF THE INVENTION

The coating for a particulate magnetic recording disk includes magnetic particles, such as gamma $Fe_2O_3$ particles, within an organic binder. Load bearing particles, such as $Al_2O_3$ particles, may also form part of the coating to improve the durability of the coating. The binder typically includes heat-hardenable polymers (such as epoxy or phenolic resins or combinations thereof, polyurethanes or acrylates), solvents, dispersing agents, and flow agents. In addition, the binder may include certain substances, such as organic additives which may decompose during curing of the coating and leave micropores on the surface of the cured coating, the micropores serving as minute reservoirs for a liquid lubricant which is later applied to the cured disk coating.

In the manufacture of a particulate magnetic recording disk, the magnetic particles are typically placed first in a media mill or ball mill to break-up agglomerations and to further enhance dispersion of the particles. The magnetic particles are then mixed in the organic binder. The resulting formulation is applied as a coating to the disk substrate by pouring it onto the substrate while it is spinning. A magnetic field is applied to the coating to orient the magnetic particles within the coating so that the particles are aligned in the preferred direction. The disk is then placed in a curing oven to cross-link the polymers in the organic binder and thus harden the coating. During the curing process, some substances may decompose or evaporate to leave micropores in the cured coating. After curing, the disk coating is buffed and then washed to remove any debris, followed by an optional burnishing operation to remove any asperities. The final step in the manufacturing process is the application of a liquid lubricant to the disk. The lubricant is absorbed into the micropores in the coating to provide lubrication between the head and the disk.

While certain substances used in the binder for other purposes may inherently decompose or evaporate during curing to form the micropores, it is also known to add certain substances for the specific purpose of micropore formation. For example, German patent application No. DE 33 41 205, published May 17, 1984, discloses the addition to the binder of a volatile material which evaporates during curing to leave micropores for retention of a liquid lubricant. U.S. Pat. No. 4,546,035, assigned to the same assignee as this application, discloses the use of polymeric additives, such as polybutene, which thermally degrade during curing and which have high volatilization efficiency to produce microvoids in the coating surface. The use of decomposing additions which form the micropores in the disk coating surface is difficult to control. If there are not enough micropores or if they are not of sufficient size, the disk will be under-lubricated which may result in wear between the disk and the head. On the other hand, if there are too many micropores or if they are of too large a size, the disk will be over-lubricated which may make it difficult for the head to break loose from the disk at startup of the disk file.

SUMMARY OF THE INVENTION

The present invention relates to an improved particulate magnetic recording disk and disk manufacturing process and includes the addition to the organic binder of a special surfactant and water that is microemulsified by the surfactant. During curing of the disk coating the water evaporates to form micropores. The number and size of the micropores in the coating is specifically selected in order to design a disk with a specific amount of lubricant and to control the lubricant retention.

The improved recording disk and the process for making it are based on the principle that certain amphiphilic molecules (surfactants) are capable of forming thermodynamically stable, monodispersed microemulsions of otherwise immiscible liquid phases, such as water and the organic binder of the disk coating. Above a certain threshold concentration, these surfactant molecules form, in nonpolar, aprotic solvents, such as the solvents used in the disk binder, aggregates of well defined size. These are called "inverted micelles" or "inverse micelles". In any given solvent system, the monodispersed droplet size of the microemulsified water depends only on the chosen surfactant, the temperature and the molar ratio of water to surfactant. With increasing water to surfactant molar ratio, the droplet size increases, resulting at constant surfactant concentration in the formation of fewer but bigger aggregates. In this manner, the size and uniformity of the water droplets in the coating, and thus the micropores formed during curing of the disk coating, is controlled. This permits the design and control of lubricant retention on the disk.

For a fuller understanding of the nature and the advantages of the present invention, reference should be made to the following detailed description taken in conjunction with the accompanying drawings.

DESCRIPTION OF THE PREFERRED EMBODIMENTS

Figure 1:
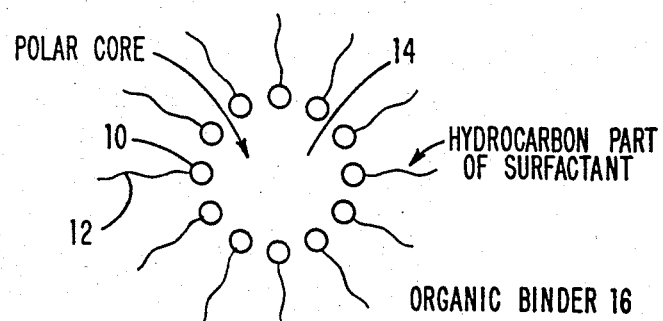
FIG. 1 is a representation of the formation of a droplet of microemulsified water by an inverse micelle forming surfactant in the organic binder of the disk coating.

A very simple representation of the structure of an inverse micelle is shown in FIG. 1. The polar end 10 of each surfactant molecule 12 is shown surrounding a water droplet 14. In the absence of the surrounding attached surfactant molecules 12, the water droplet 14 would be otherwise immiscible in the surrounding organic binder 16.

The number of molecules in each microemulsified water droplet depends for a given binder system upon the molar ratio of the water to the inverse micelle forming surfactant. The relationship of the number of water molecules, and thus the water droplet size, to the number of surrounding attached surfactant molecules is shown in Table 1. (Ref: J. Rehak, PhD Thesis, Univ. of Basel, Switzerland, 1976).

TABLE 1
AVERAGE ASSOCIATION NUMBER (N) OF AEROSOL-OT IN ISO-OCTANE AS A FUNCTION OF MOLAR RATIO (W) OF WATER TO SURFACTANT

| W | 0 | 2.78 | 5.56 | 11.11 | 16.67 | 22.22 | 44.44 |
|---|---|------|------|-------|-------|-------|-------|
| N | 15 | 31 | 45 | 116 | 221 | 324 | 1926 |

The number "N" in Table 1 is the association number or the number of surfactant molecules which surround the water droplet for the corresponding molar ratio "W" of water to surfactant. In Table 1 the surrounding immiscible fluid is iso-octane and the surfactant is Aerosol-OT (sodium di-isooctyl sulfosuccinate), available from American Cyanamid Co., among others. As the molar ratio W is increased, the number N of surfactant molecules which surround the water droplet is increased. This results in an increase in water droplet size because each surfactant molecule has an increased number of water molecules attached to it.

Not all surfactants are capable of forming inverse micelles with water. While the inverse micelle forming surfactant used to manufacture the disks according to this invention was Aerosol-OT, other surfactants would also function to form microemulsions in the solvent system of the organic binder. For any particular solvent system, a surfactant can be selected which is compatible with the binder and which has a sufficient polarity to form micelles with water and thus form a microemulsion.

The formation of inverse micelles and micro-emulsions is mainly understood to be due to a minimum in the total free energy of the system brought about by the change in the enthalpy by hydrophobic interactions of the lipophilic parts of the surfactant molecules and by a slight increase in the entropy of the solvent molecules. In practice, the selection of a suitable inverse micelle forming surfactant or surfactant mixture for a given solvent system is mainly governed by the following general guidelines:

(a) The formation of inverse micelles and micro-emulsions are favored by increased head-to-chain volume ratio, increased dipole moment and decreased solubility of the surfactant molecules. These parameters typically indicate that anionic surfactants are preferred over cationic surfactants, which are preferred over non-ionic surfactants.

(b) For ionic surfactants, large cations and large anions favor the formation of inverse micelles. For anionic surfactants, aggregation increases in the order of carbonates, phosphates and sulfonates.

(c) Branching of the lipophilic hydrocarbon chain of the surfactant leads to increased aggregation and to reduced critical micelle concentrations because the hydrophobic interaction between the hydrocarbon tails of the aggregate of invertes micelles is increased. Non-aromaticity of the surfactant molecule additionally favors the formation of inverse micelles by reducing solvent-surfactant interaction. For non-ionic surfactant systems, mixture of a high and a low molecular weight surfactant or of a surfactant and a low molecular weight alcohol strongly favors the formation of inverse micelles due to sterical optimization of hydrophobic interactions.

(d) For a given surfactant, the formation of inverse micelles slightly increases with decreasing value of the solubility parameter of the solvent. Thus, in the case of Aerosol-OT, the formation of inverse micelles increases with different solvents in the following order:

| Solvent: | | | | | |
|---|---|---|---|---|---|
| ethanol | iso-phorone | benzene | cyclohexane | iso-octane | |
| Solubility Parameter: | | | | | |
| 12.78 | 9.36 | 9.16 | 8.19 | 7.54 | |

(e) The incorporation of water or other polar substances, e.g. an electrolyte, into the inverse micelle strongly increases the formation of inverse micelles and reduces the critical micelle concentration by further reduction of the total free energy of the system. Surfactants with a high affinity to bond water via hydrogen bonds or via strong Coulomb forces favor water up-take. The size and stability of such "swollen" micelles, however, depends on the overall energy of the system and therefore on the points considered above. Due to increased electrostatic attraction, anionic surfactants typically are capable of taking up a larger amount of water than cationic surfactants. For nonionic surfactants, the water up-take exponentially increases with the number of ethoxy groups in the hydrophilic molecule part.

In summary the selection of a suitable surfactant or surfactant mixture first depends on the polarity and the solubility parameter of the solvent system to be used. Therefore, such parameters have to be estimated. Next, a choice is made as to whether a nonionic, a cationic or an anionic surfactant should be utilized. Among the factors to influence this choice are the absorption at the gamma-$Fe_2O_3$ interface and the $Al_2O_3$ interface, and chemical compatibility of the surfactant type with the binder type. After such consideration, candidate surfactants are screened for maximum head-to-chain volume ratio and maximum dipole moment within the range of still having some solubility in the solvent system employed. Branched, non-aromatic surfactants are then given priority and for the case where a non-ionic surfactant should be employed, mixtures of such surfactant with low molecular weight alcohols or with lower weight non-ionic surfactants are explored. Experimental values for critical micelle concentration and association number are obtained by vapor pressure osmometry, conductivity measurements, light scattering or spectroscopic methods. Water up-take is estimated by light scattering, turbidity and conductivity measurements, Karl-Fischer analysis or spectroscopic methods.

Examples of inverse micelle forming surfactants are the following:

For cationic surfactants: Dodecylammonium-propionate

Figure 2:
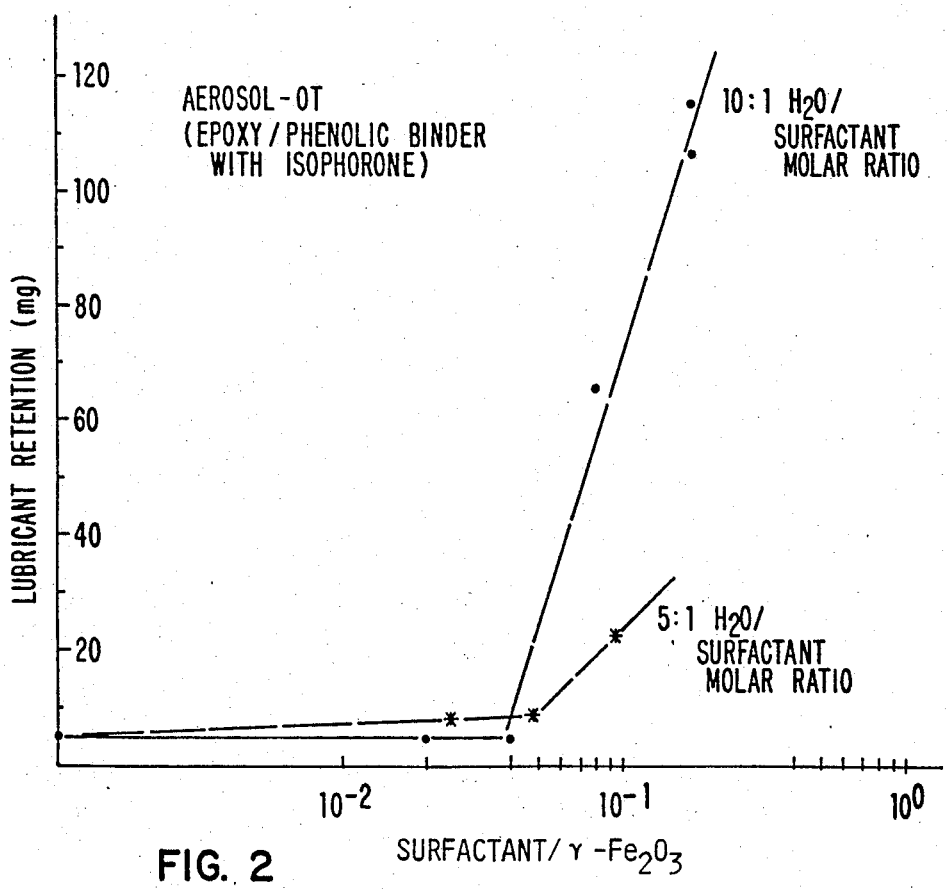
FIG. 2 is a graph of disk lubricant retention as a function of the molar ratio of surfactant to gamma iron oxide particles for various molar ratios of water to surfactant.

For anionic surfactants: Aerosol-OT = Dioctyl ester of sodium sulfosuccinic acid For nonionic surfactants: Polyoxyethylene lauryl-ethers The lubricant retention properties of various magnetic recording disks made according to the present invention is illustrated in FIG. 2. These disks had a coating of an epoxy-phenolic resin blend binder, including isophorone as a solvent, alumina ($Al_2O_3$) load-bearing particles, and gamma-$Fe_2O_3$ magnetic particles. To this binder was added water and Aerosol-OT in the various molar weight ratios as shown in FIG. 2. The lubricant retention of the subsequently cured coatings was significantly increased, once the condition of microemulsion formation by Aerosol-OT plus water was met. The critical concentration of Aerosol-OT in this type of binder and solvent is approximately $8 \times 10^{-2}$ mol/liter, as determined from FIG. 2 and the known amount of gamma-$Fe_2O_3$ particles. Below this concentration, the added water does not become micro-emulsified and therefore does not follow the described concept of forming micro-droplets of uniform size and distribution. Above this critical surfactant concentration, the lubricant retention in the coating increases with increasing micelle concentration and increases with increasing size of the micelles, as determined by the molar ratio of water to the surfactant Aerosol-OT. The critical concentration of surfactant, above which inverse micelle formation occurs, depends, at a constant temperature, on the solvent system, the surfactant used and the concentration of polar additives, which in addition to water, is the gamma iron oxide particles. The critical concentration of Aerosol-OT in the epoxy-phenolic resin binder with isophorone as a solvent, as shown in FIG. 2, may be relatively high, partly due to the concurrent and preferred absorption of surfactant at the gamma iron oxide interface. It is believed that the absorption of the surfactant at this interface also significantly increases dispersion of the magnetic particles and thus the particle orientation ratio in the final coating. Experimentally, the disks made in accordance with this invention showed that the gamma-$Fe_2O_3$ particle orientation ratio to be increased on the average by approximately 50% as compared to the orientation ratio of disks without the Aerosol-OT and water additives.

It was also found that the addition of the relatively large amount of surfactant and water to the coating did not deteriorate the disk wear durability as shown from the wear testing of unlubricated disks. The time to failure in a disk durability test for unlubricated disks made with the water and Aerosol-OT additives was approximately six times longer than for unlubricated disks without the Aerosol-OT and water additives.

The use of inverse micelle forming surfactants and water in particulate magnetic recording disk coatings enables the size and number of microdroplets in the coating, and thereby the size and number of micropores in the cured films, to be controlled. Since the absorption of the lubricant in the coating is proportional to the film surface area, desirable levels of lubricant retention are achieved on a reproducible basis strictly by designing a proper size and number of microemulsified water droplets. This is achieved in accordance with the present invention by selection of the concentration of a specific inverse micelle forming surfactant and the molar ratio of water to such surfactant.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. In a process for making a magnetic recording disk which includes the steps of providing a suitable disk substrate, preparing an organic-based binder, the binder including a solvent and having magnetic particles dispersed therein, coating the binder onto the substrate, orienting the magnetic particles in alignment with a magnetic field, curing the coating on the substrate and applying a lubricant to the cured coating, an improvement comprising the steps of, before coating on the substrate, adding an inverse micelle forming surfactant to the binder in an amount such that the concentration of surfactant in the binder is sufficient to permit inverse micelles to be formed, and adding water to the surfactant and binder in a predetermined molar ratio of water to surfactant, whereby during curing on the substrate the water evaporates from the attached inverse micelle forming surfactant and forms micropores in the cured coating for retention of the lubricant.

2. The improved process according to claim 1 wherein the step of adding the surfactant includes the step of adding sodium di-isooctyl sulfosuccinate.

* * * * *